United States Patent [19]
Kobayashi

[11] Patent Number: 5,428,664
[45] Date of Patent: Jun. 27, 1995

[54] DUAL MODE PORTABLE TELEPHONE WHICH PREVENTS POWER BEING APPLIED TO THE ANALOG OR DIGITAL SIGNAL PROCESSORS NOT SELECTED FOR COMMUNICATION

[75] Inventor: Takeo Kobayashi, Tokyo, Japan

[73] Assignee: NEC Corporation, Tokyo, Japan

[21] Appl. No.: 34,555

[22] Filed: Mar. 19, 1993

[30] Foreign Application Priority Data

Mar. 19, 1992 [JP] Japan .................. 4-062942

[51] Int. Cl.⁶ .......................................... H04M 11/00
[52] U.S. Cl. ...................................... 379/58; 455/33.2; 455/38.2; 455/54.1; 455/89
[58] Field of Search ................ 379/56, 58, 411; 455/33.2, 34.2, 38.3, 54.1, 70, 127, 89

[56] References Cited

U.S. PATENT DOCUMENTS 5,241,690  8/1993  Larsson et al. ............... 455/54.1
5,257,401  10/1993  Dahlin et al. .................. 455/33.2
5,263,079  1/1993  Umemoto ....................... 379/58
5,267,262  11/1993  Wheatley, III ................. 455/54.1
5,276,917  1/1994  Vanhanen et al. ............. 455/89

FOREIGN PATENT DOCUMENTS 0224422  9/1988  Japan ............................. 455/38.3
5102924  4/1993  Japan ............................. 379/58
9119357  12/1991  WIPO ............................. 455/38.3

Primary Examiner—Curtis Kuntz
Assistant Examiner—William Cumming
Attorney, Agent, or Firm—Ostrolenk, Faber, Gerb & Soffen

[57] ABSTRACT

A portable telephone capable of selectively effecting analog communication or digital communication in response an analog signal or a digital signal. Power is prevented from being applied to either of an analog signal processing section and a digital signal processing section which does not join in communication.

3 Claims, 5 Drawing Sheets

5,428,664

DUAL MODE PORTABLE TELEPHONE WHICH PREVENTS POWER BEING APPLIED TO THE ANALOG OR DIGITAL SIGNAL PROCESSORS NOT SELECTED FOR COMMUNICATION

BACKGROUND OF THE INVENTION

1. Field of the Invention

The present invention relates to a portable telephone and, more particularly, to a portable telephone capable of selectively effecting analog or digital communication on receiving an analog or digital signal.

2. Description of the Related Art

A portable telephone having the above-mentioned capability is extensively used today and generally made up of an antenna, a handset, a radio section, an analog signal processing section and a digital signal processing section for processing signals particular to analog communication and digital communication respectively, a first common signal processing section connected to the radio section for selectively modulating or demodulating an analog or a digital signal, a second common signal processing section connected between the two signal processing sections and the handset for executing filtering, analog-to-digital (AD) conversion and other preprocessing, and a control section for selectively applying power to either of the two signal processing sections. In the event of analog communication, for example, the control section prevents power from being applied to the digital signal processing section which does not join in the communication thereby saving power.

However, the conventional portable telephone has a problem that both of the first and second common signal processing sections have to operate with no regard to the type of communication i.e., analog or digital. Hence, the power to be consumed by these signal processing sections is required.

SUMMARY OF THE INVENTION

It is, therefore, an object of the present invention to provide a portable telephone with a selective analog/-digital communication capability which consumes far less power than conventional units.

A portable telephone capable of selectively effecting analog communication or digital communication of the present invention comprises a communication system selecting section for receiving information designating analog communication or digital communication from a central station, an analog signal processing section for selectively modulating or demodulating an analog signal and processing the analog signal, a digital signal processing section for selectively modulating or demodulating a digital signal and processing the digital signal, switch sections for selecting either of the analog signal processing section and digital signal processing section, and a control section for controlling the communication system selecting section, controlling the switching section in response to the information received from the central station, and preventing power from being applied to the analog signal processing section or the digital signal processing section which does not join in the communication.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
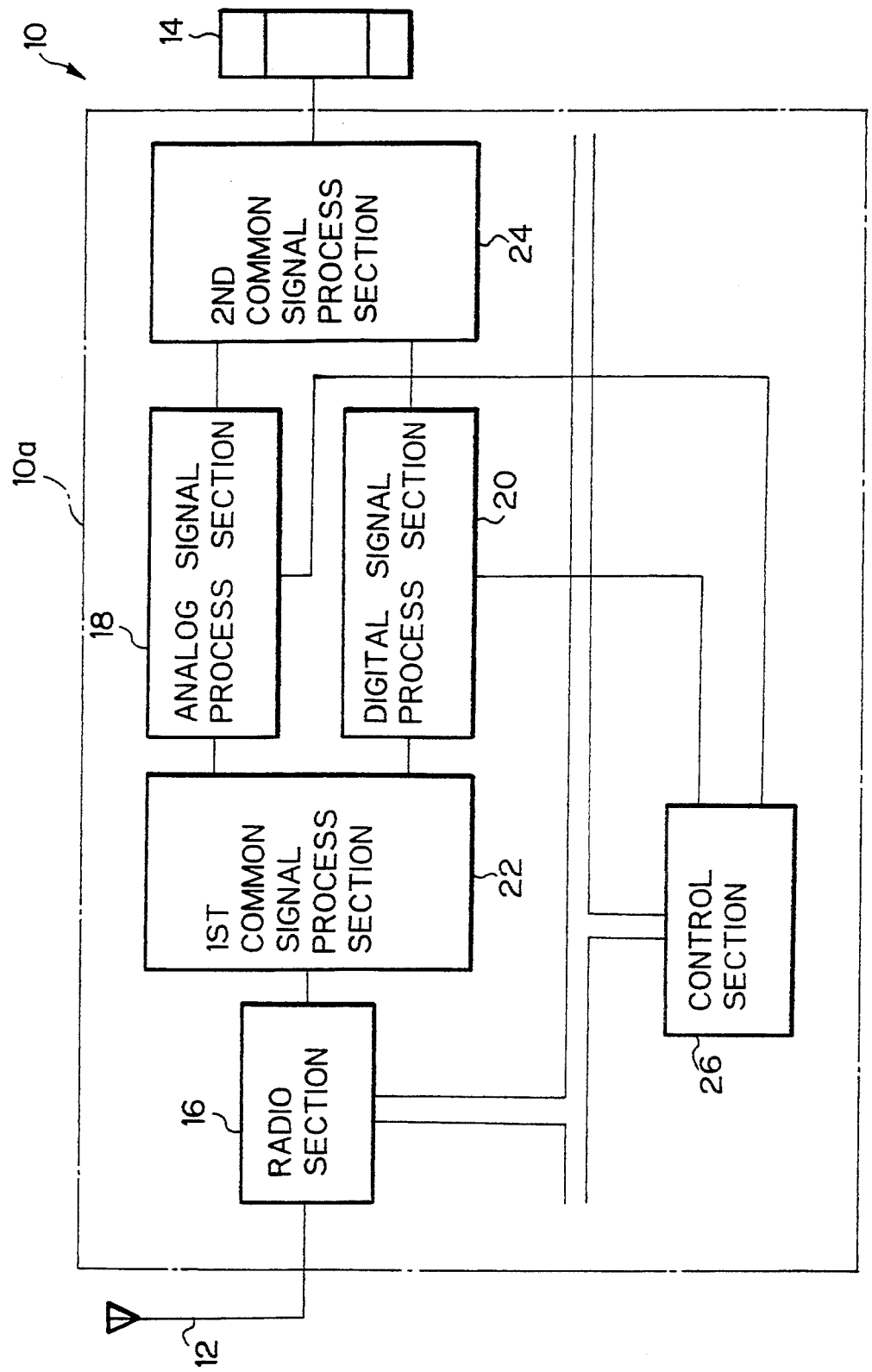
FIG. 1 is a block diagram schematically showing a conventional portable telephone.

To better understand the present invention, a brief reference will be made to a conventional portable telephone, shown in FIG. 1. As shown, the portable telephone, generally 10, has a body 10a, an antenna 12 extending out from the body 10a, and a handset 14. The body 10a accommodates a radio section 16, an analog signal processing section 18 and a digital signal processing section 20 for processing signals particular to analog communication and digital communication, respectively, a first common signal processing section 22 connected to the radio section 16 for selectively modulating or demodulating an analog or digital signal, a second common signal processing section 24 connected between the signal processing sections 18 and 20 and the handset 14 for executing filtering, AD conversion and other preprocessing, and a control section 26 for selectively applying power to either of the signal processing sections 18 and 20. When digital communication or analog communication is held on the telephone 10, the control section 26 shuts off the power supply to one of the analog signal processing section 18 and digital signal processing section 20 which does not join in the communication. As a result, the power consumption of the telephone 10 is reduced.

However, the problem with the conventional telephone 10 is that both of the first and second common signal processing sections 22 and 24 have to operate with no regard to the type of communication, i.e., analog or digital. Hence, the power to be consumed by these signal processing sections 22 and 24 is essential.

Figure 2:
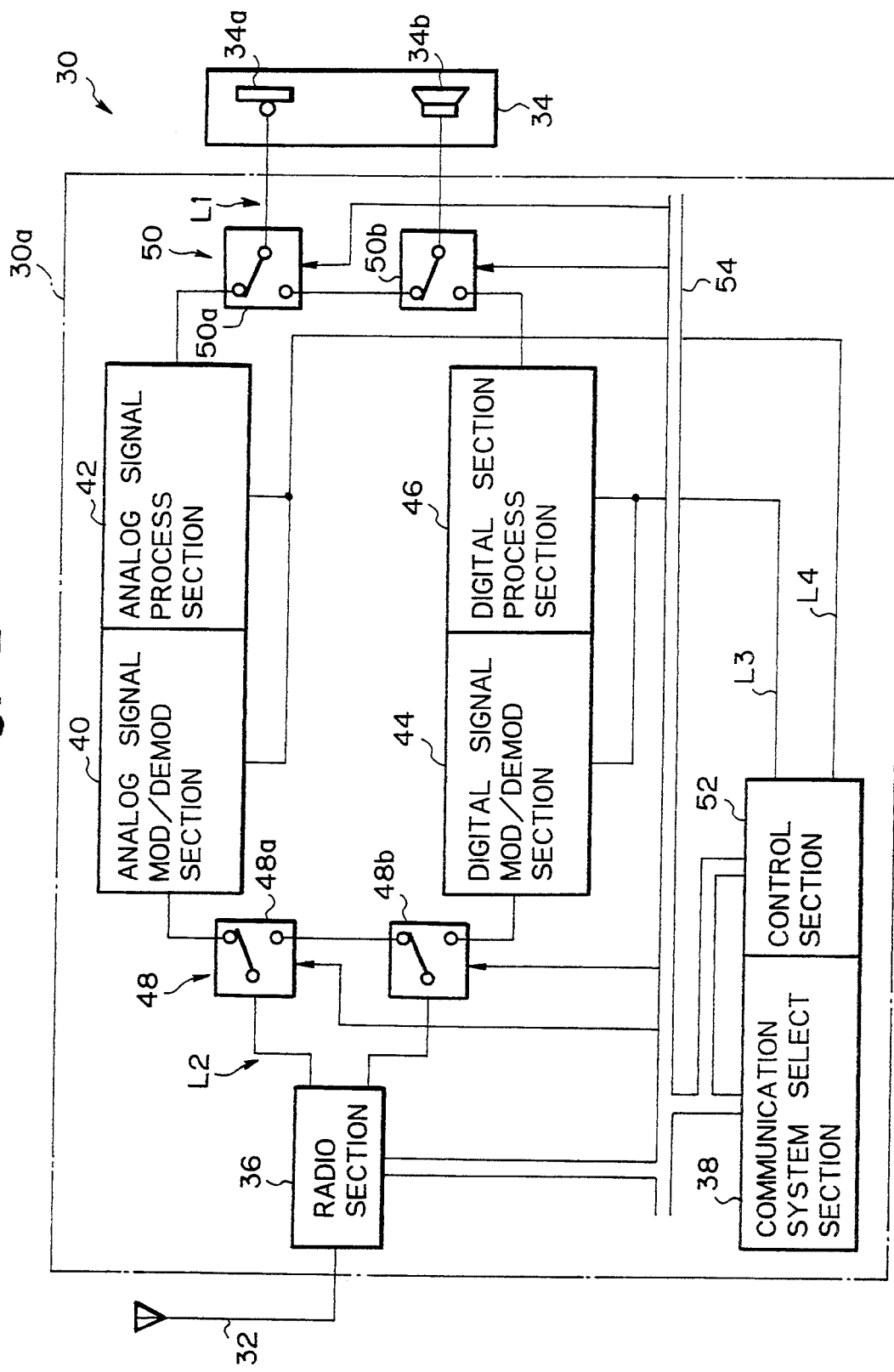
FIG. 2 is a block diagram schematically showing a portable telephone embodying the present invention.

Referring to FIG. 2, a portable telephone embodying the present invention is shown and generally designated by the reference numeral 30. As shown, the portable telephone 30 is generally made up of a body 30a, an antenna 32 extending out from the body 30a, and a handset 34 provided with a microphone 34a and a speaker 34b. The body 30a has therein a radio section 36 connected to the antenna 32 for receiving and transmitting signals. A communication system selecting section 38 receives an information signal designating either of analog communication and digital communication from a central station via the radio section 36. An analog signal modulating/demodulating section 40 selectively modulates or demodulates an analog signal in the event of analog communication while an analog signal processing section 42 processes the analog signal. Likewise, a digital signal modulating/demodulating section 44 selectively modulates or demodulates a digital signal in the event of digital communication while a digital signal processing section 46 processes the digital signal. A first and a second switch section 48 and 50, respectively select analog communication or digital communication in response to information from the communication system selecting section 38. The switch sections 48 and 50 are respectively constituted by switches 48a and 48b and switches 50a and 50b. A control section 52 applies power to either of the analog signal modulating-/demodulating section 40 and analog signal processing section 42, and the digital signal modulating-/demodulating section 44 and digital signal processing section 46, selected by the switch sections 48 and 50 in response to the information from the section 38. The sections described so far interchange information and control signals over a control bus 54. Labeled L1, L2 and L3 and L4 in the figure are a speech signal path, a radio signal path, and operation inhibit signal paths. In the illustrative embodiment, the second common signal processing section 24 of the conventional telephone 10 is built in each of the analog and digital signal processing sections 42 and 46. Further, the analog and digital signal processing sections 40 and 44 are constructed independently of each other, i.e., they are not integrally built in the first common signal processing section 22, FIG. 1.

Figure 3:
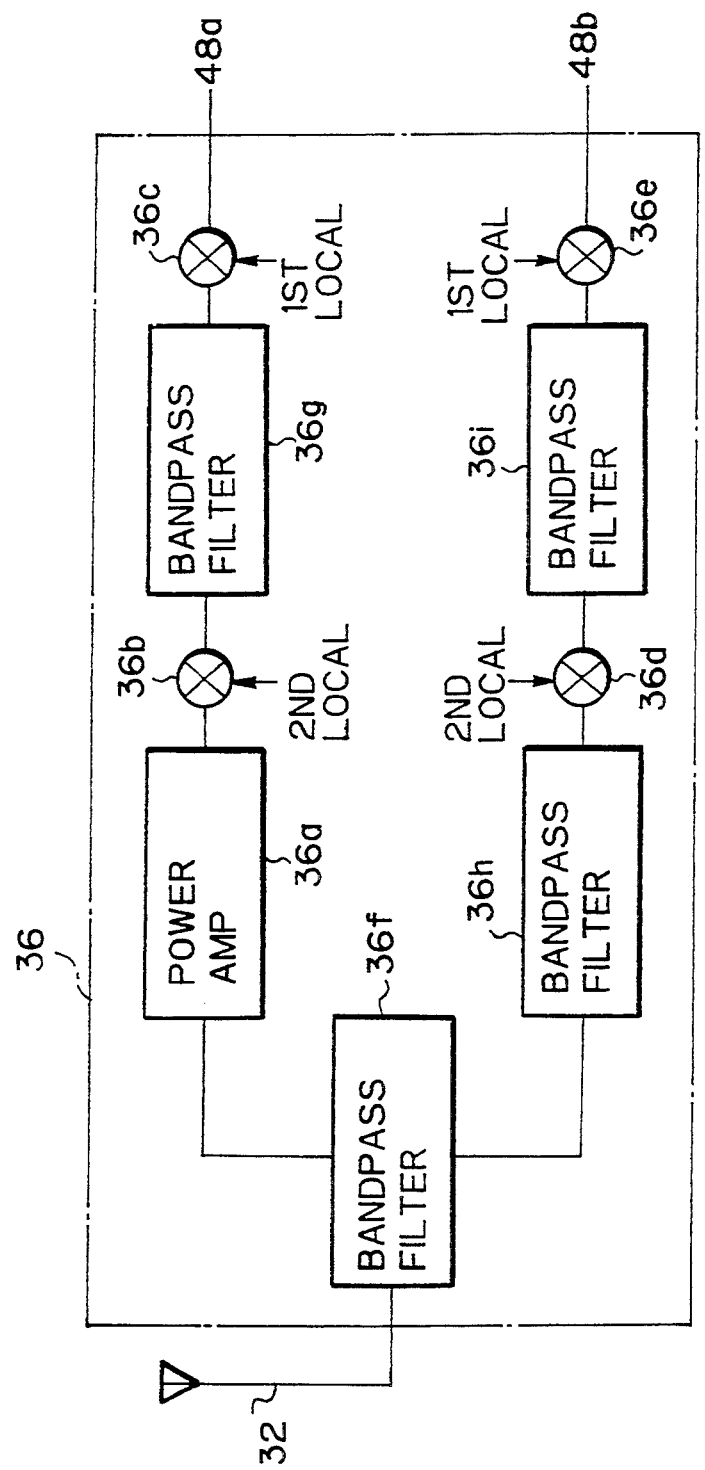
FIG. 3 is a schematic block diagram showing a specific construction of a radio section included in the embodiment.

As shown in FIG. 3, the radio section 36 is constituted by a power amplifier 36a, mixers 36b–36e for RF (Radio Frequency)/IF (Intermediate Frequency) conversion, and bandpass filters.

Figure 4:
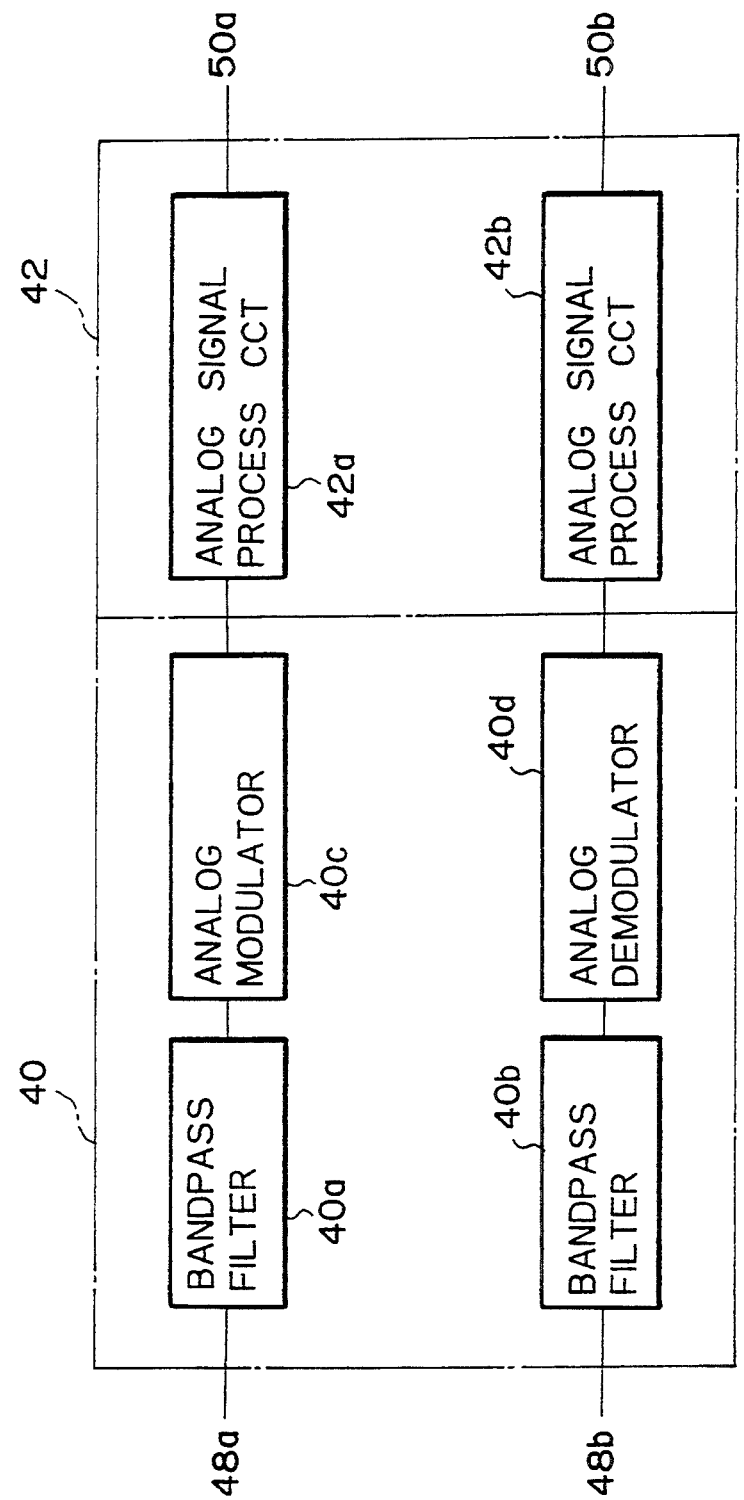
FIG. 4 is a schematic block diagram showing specific constructions of an analog modulating/demodulating section and an analog signal processing section also included in the embodiment.

FIG. 4 shows the analog signal modulating-/demodulating section 40 specifically. As shown, this section 40 is made up of bandpass filters 40a and 40b, an analog signal modulator 40c, and an analog signal demodulator 40d. As also shown in FIG. 4, the analog signal processing section 42 has an analog signal processing circuits 42a and 42b connected to the modulator 40c and the demodulator 40d, respectively.

Figure 5:
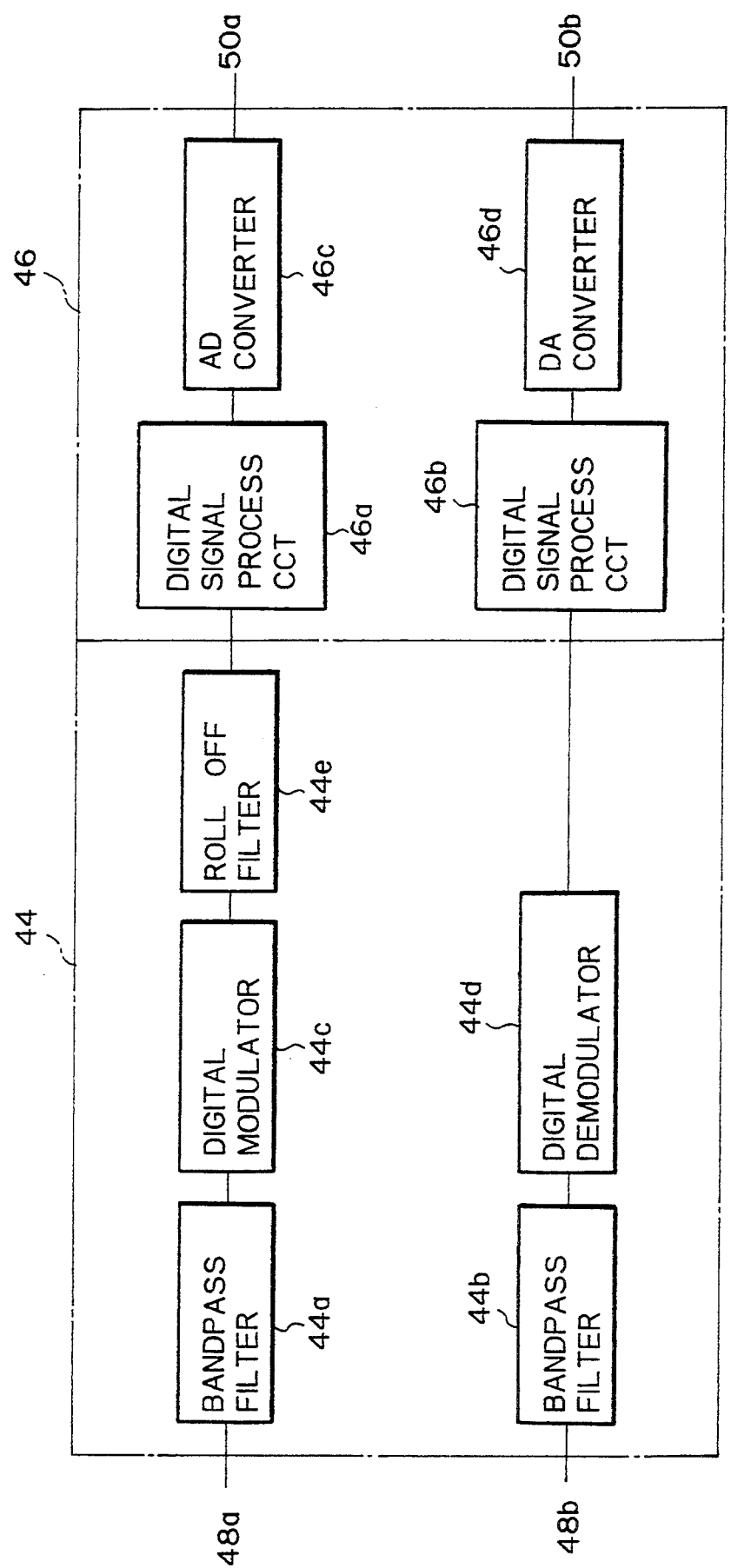
FIG. 5 is a schematic block diagram showing specific constructions of a digital modulating/demodulating section and a digital signal processing section further included in the embodiment.

As shown in FIG. 5, the digital signal modulating-/demodulating section 44 is made up of bandpass filters 44a and 44b, a digital signal modulator 44c, a digital signal demodulator 44d, and a roll-off filter 44e. As also shown in FIG. 5, the digital signal processing section 46 is constituted by digital signal processing circuits 46a and 46b, an AD converter 46c, and a digital-to-analog (DA) converter 46d.

The operation unique to the embodiment is as follows. When the central station sends control information designating either of analog communication and digital communication to the telephone 30, it is received by the radio section 36 via the antenna 32. The control information is transferred from the radio section 36 to the communication system selecting section 38 over the control bus 54. Assume that the control information designates analog communication by way of example. Then, in response to the control information, the communication system selecting section 38 controls the switch sections 48 and 50 to connect the analog signal processing section 42 and analog signal mod/demod section 40 to the speech signal path L1 and radio signal path L2, respectively. At the same time, the selecting section 38 controls the digital signal processing section 46 and digital signal mod/demod section 44 to be not used via the operation inhibit signal path L3 so as not to apply power thereto. This is successful in saving power otherwise consumed by the digital signal processing section 46.

In summary, it will be seen that the present invention provides a portable telephone which saves power more than conventional units. This advantage is derived from a unique arrangement wherein a communication system selecting section responsive to control information from a central station, an analog signal modulating-/demodulating section and an analog signal processing section, and a digital signal modulating/demodulating section and a digital signal processing section are constructed independently of one another. Switch sections select one of the two signal processing sections while a control section prevents power from being applied to the other signal processing section.

Various modifications will become possible for those skilled in the art after receiving the teachings of the present disclosure without departing from the scope thereof.

What is claimed is:

1. A portable telephone capable of selectively effecting analog communication or digital communication, comprising:
   communication system selecting means for receiving information designating analog communication or digital communication from a central station;
   analog signal processing means for selectively modulating or demodulating an analog signal and processing said analog signal;
   digital signal processing means, independent of said analog signal processing means, for selectively modulating or demodulating a digital signal and processing said digital signal;
   switching means for selecting for communication either of said analog signal processing means and said digital signal processing means; and
   control means responsive to said communication system selecting means for controlling said switching means so as to select for communication either of said analog signal processing means and said digital signal processing means based upon said information received by said communication system selecting means from said central station and said control means further preventing power from being applied to said analog signal processing means or said digital signal processing means or said digital signal processing means not selected for communication.

2. A telephone as claimed in claim 1, wherein said analog signal processing means and said digital signal processing means each comprises a filtering function for preprocessing a speech signal to be ted to a handset included in said portable telephone.

3. An apparatus with reduced power consumption in a portable telephone comprising:
   means for receiving control information designating either of analog communication and digital communication;
   an analog communication system comprising:
      an analog signal modulating/demodulating section; and
      an analog signal processing section;
   a digital communication system, independent of the analog communication system, comprising:
      a digital signal modulating/demodulating section; and
      a digital signal processing section;
   selection means, responsive to the control information, for designating a selected system and a non-selected system, the selection means selecting between the analog communication system and the digital communication system;
   control means for preventing power from being applied to the non-selected system;
   switching means responsive to the control means to connect the selected system to communication signal paths.

* * * * *